(12) United States Patent
Smidth et al.

(10) Patent No.: US 10,466,385 B2
(45) Date of Patent: Nov. 5, 2019

(54) COHERENT MEASUREMENT METHOD FOR DOWNHOLE APPLICATIONS

(71) Applicant: Scientific Drilling International, Inc., Houston, TX (US)

(72) Inventors: Peter Smidth, San Luis Obispo, CA (US); Timothy Whitacre, Paso Robles, CA (US)

(73) Assignee: SCIENTIFIC DRILLING INTERNATIONAL, INC., Houston, TX (US)

( * ) Notice: Subject to any disclaimer, the term of this patent is extended or adjusted under 35 U.S.C. 154(b) by 77 days.

(21) Appl. No.: 15/676,463

(22) Filed: Aug. 14, 2017

(65) Prior Publication Data

US 2018/0045850 A1 Feb. 15, 2018

Related U.S. Application Data

(60) Provisional application No. 62/374,417, filed on Aug. 12, 2016.

(51) Int. Cl.
*G01V 7/06* (2006.01)
*G01V 99/00* (2009.01)

(52) U.S. Cl.
CPC .............. *G01V 7/06* (2013.01); *G01V 99/005* (2013.01)

(58) Field of Classification Search
CPC .............................. G01V 7/06; G01V 99/005
See application file for complete search history.

(56) References Cited

U.S. PATENT DOCUMENTS

| | | | |
|---|---|---|---|
| 9,163,498 B2 * | 10/2015 | Cairns ............... | E21B 47/02232 |
| 2005/0150689 A1 | 7/2005 | Jogi et al. | |
| 2013/0153206 A1 | 6/2013 | Cairns et al. | |
| 2016/0041293 A1 | 2/2016 | Boudah et al. | |
| 2016/0145993 A1 | 5/2016 | Gillan et al. | |

OTHER PUBLICATIONS

International Search Report and Written Opinion issued in international application No. PCT/US17/46773 dated Feb. 13, 2018 (9 pages).

* cited by examiner

*Primary Examiner* — Bryan Bui
(74) *Attorney, Agent, or Firm* — Adolph Locklar (57) ABSTRACT

A signal method may include obtaining a first set of signal measurements, processing the first set of signal measurements into a phase reference obtaining a second set of signal measurements, the second set of signal measurements varying as a function of the phase reference, detecting an item of interest using the second set of signal measurements and the phase reference, and using the item of interest.

23 Claims, 5 Drawing Sheets

COHERENT MEASUREMENT METHOD FOR DOWNHOLE APPLICATIONS

CROSS-REFERENCE TO RELATED APPLICATIONS

This application is a nonprovisional application that claims priority from U.S. provisional application No. 62/374,417, filed Aug. 12, 2016, the entirety of which is hereby incorporated by reference.

TECHNICAL FIELD/FIELD OF THE DISCLOSURE

The present disclosure relates generally to compensation of rotating sensors within a wellbore.

BACKGROUND OF THE DISCLOSURE

Coherent Detection is typically used in communication systems. Spectral coherence between signals is a measure of the relationship between the signals, indicating how well the spectral content of a given signal can be explained by a linear transformation of another signal. For the purposes of this application, coherency is defined as how well a portion of a given signal can be explained based on linear and/or nonlinear transformations of one or more other signals. Coherent detection uses the knowledge of the coherency between 2 or more signals to estimate the information from one or more of the signals.

Oil and Gas exploration uses measurement while drilling (MWD) and logging while drilling (LWD), which involves some combination of directional drilling, formation evaluation, drilling dynamics, and ranging. Directional drilling uses one or more survey instruments aimed at determining position and orientation of the drill bit, bottom hole assembly, well, or other equipment involved in the drilling process. Formation evaluation involves capturing measurements from sensors that respond to various characteristics of the proximate formation, including, but not limited to, natural gamma ray detectors, spectral gamma ray detectors, resistivity sensors, density sensors, and porosity sensors. Drilling dynamics involves capturing measurements from sensors that respond to force, acceleration, velocity, or position of various components of the BHA, including the bit. Drilling dynamics information is typically used to stop or prevent damage to sensors due to vibration and/or provide feedback on parameters that a directional driller is attempting to control, such as weight on bit (WOB) or Torque on Bit. Ranging involves determining relative positioning and orientation between 2 or more locations in the formation, typically between a wellbore being drilled, and one or more nearby wellbores.

Directional drilling may use information on the orientation and position of the bit, such as azimuth, inclination, and toolface, being used to drill a wellbore and a model of the path of the wellbore already drilled to be compared with the expected path, referred to as a well plan. A survey tool is used to provide the base level of information required. Typically, survey data is captured while the survey tool is stationary in order to minimize the noise measured by the sensors of the survey tool(s). Additional information on orientation and position is desired while drilling, but such information is typically less reliable due to the motion of the sensors during the drilling process.

With formation evaluation applications, sensors in the downhole tool are used to collect information about the formation in proximity to the tool to generate a model of the surrounding formation. Sensors typically are rotated within the wellbore in order to measure quantities related to the formation at different angular positions. Typically this rotation is caused by either rotation of the entire drill string by equipment located on the drill rig, or by a mud motor powered by the flow of mud through the drill pipe. In some cases, tools may rotate the sensors through other means. In other cases, the tool may include an array of sensors in order to provide measurements corresponding to different angular positions with respect to the tool. Sensors may include gamma sensors used to measure radiation in the surrounding formation and may be binned to generate the model of the surrounding formation.

Drilling dynamics is the measurement of parameters related to the drilling process that affect the performance of the drilling process in addition to the dynamic environment experienced by the bottom hole assembly (BHA). Measurements that are used for drilling dynamics may include, for example and without limitation, downhole weight on bit, bit torque, bit bounce, BHA whirl, bit whirl, and stick-slip. These measurements typically provide indications of dynamic modes of the BHA, which can be used to adjust various control inputs into the drilling process to make the drilling dynamics in line with some objective of the drilling operator. Such objectives would include, reducing vibration of the tools on the drill string, improving rate of penetration (ROP), avoiding BHA whirl, obtaining a specific weight on bit, and obtaining a specific bit torque.

For each of these applications, noise in the data from the sensors may cause inaccuracies in the generated model. There exists a need to extract more accurate data from the sensors to provide better results in directional drilling, formation evaluation, and drilling dynamics. There exists a need to derive better information regarding the orientation and position of the bit using noisy data to generate a better model of the wellbore. There exists a need to derive better information about the formation in proximity to the tool using noisy data to generate a better model of the formation.

SUMMARY

The present disclosure provides for a method. The method may include obtaining a first set of signal measurements with a first sensor, the first set of signal measurements varying as a function of a phase reference. The method may include obtaining a second set of signal measurements with a second sensor. The second set of signal measurements may include an item of interest. The second set of signal measurements may vary as a function of the phase reference. The method may include detecting the item of interest using the second set of signal measurements and the phase reference. The method may include using the item of interest.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Certain terms are used herein as follows:

Down conversion—the multiplication of 2 signals, one of which is normally a complex phase reference with nominally fixed amplitude and time varying frequency.

Up conversion—The reverse operation of down conversion.

I and Q—in phase and quadrature components of a complex signal. (I+Q*j).

Phase reference—the reference signal that is used for down-conversion and up-conversion.

Complex Baseband Signal—A complex signal where frequency components of interest, such as, for instance, gravity components have been down converted to or near zero frequency.

Coherence—For the purposes of this application, coherency is defined as how well a portion of a given signal can be explained based on linear and/or nonlinear transformations of one or more portions of one or more other signals. The given signal may include multiple portions that are in one or more frequency bands that contain items of interest. The given signal may also contain noise and other items that are not of interest.

Coherent Filtering—The process of filtering noise from a portion of a first signal by utilizing information contained in one or more separate signals and/or one or more separate portions of the same signal where the information is coherent with the item of interest in the first signal. In other words, knowledge of the coherency between two or more signals may be used to estimate the desired item of interest contained in portions of one or more of the signals. Examples of coherent filtering include, for example and without limitation, a combination of down-conversion, filtering, and then up-conversion, or utilizing a Kalman Filter with a harmonic oscillator model.

In an example coherent filtering operation, a first set of measurements is taken. The first set of measurements may include information that is coherent with information contained in a second set of measurements. The first set of measurements may be referred to as a reference signal. The first set of measurements may contain different noise characteristics than the noise characteristics of the second set of measurements. The different noise characteristics may be due to the first and second sets of measurements being taken by sensors at different locations or by different types of sensors. The second set of measurements may include information relating to an item of interest to be extracted from the second set of measurements. In some embodiments, for example and without limitation, the item of interest may be a parameter or other information detected by the sensor that is desired to be isolated from the rest of the second set of measurements. For example and without limitation, in some embodiments, the item of interest may be cross-axis component of gravity, a cross-axis component of the Earth's rotation rate, a cross-axis component of a magnetic field, cross-axis resistivity, or cross-axis density.

Because of the noise in the second set of measurements, the estimate of the at least one item of interest using only the second set of measurements may not be of sufficient quality for a given application. Sufficient quality is defined by estimates whose signal to noise ratio is large enough to support the requirements of a given application in terms of precision constraints, bandwidth constraints, and/or latency constraints. In order to provide estimates of sufficient quality, additional information may be needed regarding the at least one item of interest, the variation of the at least one item of interest, and/or the noise contained in the second set of measurements.

The coherent filtering method, described in embodiments of this disclosure, may be used when the first set of measurements contains information regarding variation of the at least one item of interest in the second set of measurements or information regarding the noise contained in the second set of measurements.

For example, in some embodiments, the first set of measurements and the second set of measurements are caused to vary by some outside occurrence. For example and without limitation, the variation may be caused in some embodiments by rotation of a drill string, movement of the drill string, rotation of the sensors by a motor (such as a stepper, brushless, or brushed motor) on a tool, or other natural or artificial phenomena. In some non-limiting embodiments, the outside occurrence that causes the variation may be a change in the orientation and/or position of the first and second set of sensors, wherein the changes in orientation and/or position of the first set of sensors are related to the changes in orientation and/or position of the second set of sensors by some linear or nonlinear function. In other non-limiting embodiments, said means are the modulation of a value that couples into the item of interest. For example, the energization of a solenoid in a nearby wellbore may generate a magnetic field that couples into the magnetic readings from magnetic sensors located within a wellbore.

In some embodiments, the relationship between the variation in the first set of measurements and the second set of measurements is either known, or a model of the variation is known. The information contained in the first set of measurements may be able to provide information on how the at least one item of interest in the second set of measurements should vary. In some embodiments, coherent filtering may constrain the estimate of the at least one item of interest such that it conforms to the expected variation based on the information contained in the first set of measurements regarding the variation. The addition of a constraint may allow a more accurate estimate to be made. The result of coherent filtering may be, for example and without limitation, an improvement in the signal to noise ratio of the estimate of the at least one item of interest. There are a number of problems in the MWD, LWD, wellbore surveying, and wellbore logging sectors of the oil and gas industry that may benefit from such an improvement in estimates that can be achieved with coherent filtering as described in this application.

In some embodiments, for example and without limitation, the magnitude of the cross axis projection of the gravitational field (referred to as Across) and/or an estimate of the angular position (referred to as gravity toolface) of the cross-axis projection of the gravitational field may be an item of interest of which an estimate may be desired. In some embodiments, at least one accelerometer used for measuring the gravitational field may experience both vibration and rotation. In some embodiments, the rotation may be constant or may vary in rate. At least one separate measurement is available from at least one separate aiding sensor, wherein the at least one separate measurement contains information regarding the rotational states of the tool with respect to at least one frame of reference, said rotational states being angular position or any derivatives or integrals of angular position, including, but not limited to, angular velocity, angular acceleration, and angular jerk. One with ordinary skill in the art would be familiar with the types of sensors that can provide such rotational state information, which include, but are not limited to, magnetic sensors, angular rate sensors, angular position sensors, accelerometers, tachometers, distance sensors, resolvers, and encoders. Any combination of one or more of sensors providing rotational state information may be used. The Coherent filtering method described in this disclosure may provide improved estimates of Across and/or gravity toolface that are of higher bandwidth, lower latency, and/or less noisy (higher precision) than what could be estimated solely by the measurements from the at least one accelerometer. In addition, the phase and magnitude of the cross-axis projection of the gravitational field with respect to the at least one frame of reference may be estimated. In some such embodiments, the estimates may have similar characteristics and benefits as the estimate of gravity toolface and Across. These relative estimates may include, but are not limited to, the relative angle between gravity toolface and magnetic toolface and the relative magnitude between Across and the cross axis projection of the magnetic field (Bcross). These relative estimates provided by coherent filtering may be used in multiple specific applications including, for example and without limitation, formation evaluation, directional drilling, drilling dynamics, and ranging.

In some embodiments, with regard to formation evaluation, the relative estimates may be used with, for example and without limitation, gamma ray imaging, spectral gamma imaging, resistivity imaging, sonic imaging, acoustic imaging, density imaging, porosity imaging, and optical imaging. An improved gravity toolface may, for example and without limitation, enable a better resolution image for such imaging applications, particularly in situations in which the imaging tool experiences vibration and varying rotation rates. Improvements in the various types of images in the field of formation evaluation may, for example and without limitation involve binning the value that is being imaged by ranges of gravity toolface. The improved precision of the gravity toolface measurement may allow for less blurring between bins, and may thus result in the ability to divide the image into more bins, thereby generating a more detailed model of the surrounding formation. In some embodiments, the high bandwidth gravity toolface estimate may be used to coherently filter the value to be imaged. In such an embodiment, the coherent filtering of the value to be imaged may result in an image or model of the formation that is a continuous function of gravity toolface.

In some embodiments, with respect to directional drilling, an improved gravity toolface estimate may be used to steer more accurately with either a bent sub motor or a rotary steerable tool. An improved estimate of Across can be used to provide a more accurate and more precise estimate of static and/or continuous inclination, particularly at low inclinations. When the relative estimates include relative magnitude and/or phase information with respect to the local magnetic field, a continuous azimuth can be calculated with improved accuracy and precision. The improved accuracy and precision may therefore result in more accurate course corrections to be issued.

In some embodiments, with respect to wellbore surveying applications, the same benefits gained in improved inclination and azimuth accuracy and precision associated with directional drilling may be realized by using improved gravity toolface and/or Across estimates, and may therefore more accurately determine a model of the path of the wellbore.

In some embodiments, with respect to drilling dynamics applications, an accurate real-time gravity toolface can be used to provide estimates of values such as bending force vs toolface, vibration vs toolface, torque vs toolface, RPM vs toolface, RPM variation vs toolface, axial acceleration vs toolface, and bitbounce as a function of toolface. As a result, a more accurate assessment of the condition and status of downhole tools in the wellbore may be made and the drilling dynamics estimates may be used to improve drilling performance by improving ROP, build rate, bit wear, etc.

In some embodiments, coherent filtering may be used to identify sensor parameters such as scale factor, bias, and misalignment. In one example, measurements of two or more accelerometers configured to sense a projection of the acceleration due to the gravitational field may include a combined root sum squared magnitude that is not constant when residual errors in the scale factor, bias, or misalignments between the sensors exist. A model of the variation in the root sum squared magnitude of a function of measured gravity toolface and residual sensor parameter errors may be used to identify the values of the residual sensor parameter errors. Another similar example is when at least two magnetometers replace the at least two accelerometers in the above example. In this case, the magnetic toolface, Bcross, and residual magnetic sensor parameter errors may be identified through the coherent filtering process.

Figure 1:
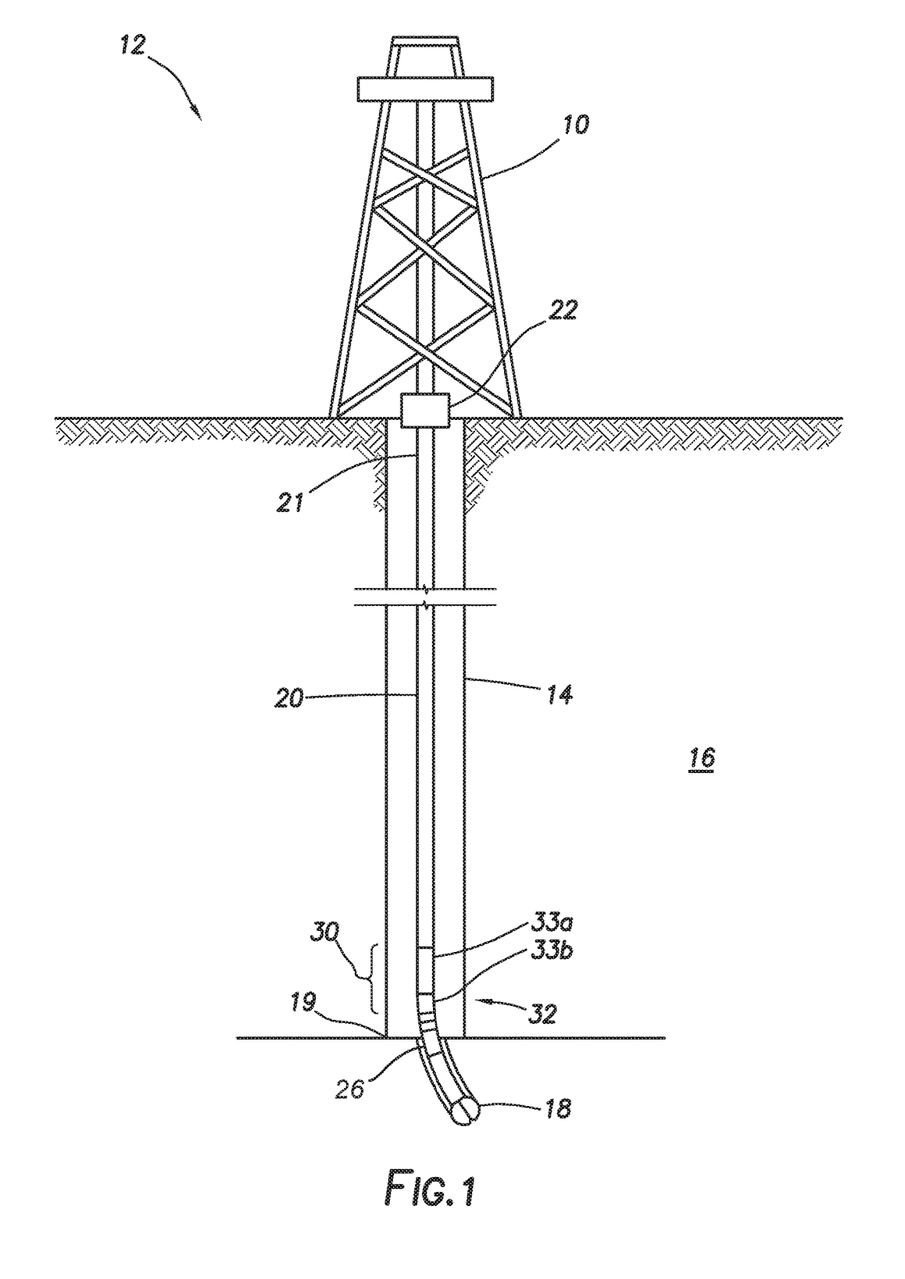
FIG. 1 is a schematic view of a drilling system consistent with at least one embodiment of the present disclosure.

FIG. 1 depicts drilling system 12, which includes drilling rig 10. Drilling rig 10 drills wellbore 14 into formation 16. Wellbore 14 is drilled with drill bit 18 positioned at a bottom end 19 of drill string 20. Rotating drill string 20 is supported at upper end 21 by drilling equipment 22. Drill bit 18 may be rotated by a fluid motor, such as mud motor 26. Drilling equipment 22 may pump fluid, such as drilling mud, through drill string 20 to drill bit 18. Rotating drill string 20 may include downhole tool 30. Downhole tool 30 may be positioned anywhere along rotating drill string 20 including at a position above mud motor 26 as shown, below mud motor 26, or on mud motor 26. Rotating drill string 20 may include one or more sensors 32. In some embodiments, sensors 32 may be positioned anywhere along rotating drill string 20 including at a position above mud motor 26 as shown, below mud motor 26, or on mud motor 26. Sensors 32 may be included as part of a sonde type tool or collar based tool. In some embodiments, downhole tool 30 may include first sensor 33a and second sensor 33b. In some embodiments, first sensor 33a and second sensor 33b may be included as part of a single tool. First sensor 33a may be used to generate a first set of signal measurements and second sensor 33b may be used to generate a second set of signal measurements. The first and second sets of signal measurements may be generated by first and second sensors 33a, 33b such that they have the same rotational rate as they are both positioned on rotating drill string 20 whether both above mud motor 26, below mud motor 26, or on mud motor 26. In some embodiments, the first set of signal measurements may be used to identify one or more items of interest in the second set of signal measurements as further discussed below.

First and second sensors 33a, 33b may be, for example and without limitation, accelerometers, gyroscopes, magnetometers, resolvers, resistivity sensors, gamma sensors, distance sensors such as caliper or acoustic sensors, density sensors, RPM or jerk sensors, weight on bit sensors, or torque sensors. In some embodiments, first and second sensors 33a, 33b may be the same type of sensor. In some embodiments, first and second sensors 33a, 33b may be different types of sensor.

As non-limiting example, in certain embodiments of the present disclosure, first sensor 33a may be an accelerometer, such as a multi-axis accelerometer. In some embodiments of the present disclosure, for example and without limitation, second sensor 33b may be a magnetometer, such as a multi-axis magnetometer.

In certain embodiments, the lateral gravity vector of a component of rotating drill string 20 or downhole tool 30 located along the rotation axis of rotating drill string 20 or the rotation axis of downhole tool 30 may be measured using first sensor 33a, which may be a multi-axis accelerometer. In certain embodiments, first sensor 33a may include a single accelerometer with one or more sensitive axes or two or more accelerometers each with a single sensitive axis, or a combination thereof. The axes of the multi-axis magnetometer of first sensor 33a may be nominally orthogonal to each other. When first sensor 33a measures two axes that are non-parallel to the rotation axes, the rotation axis of rotating drill string 20, or the rotation axis of downhole tool 30, first sensor 33a may generate a rotating vector based on gravity with superimposed interference from mechanical vibration. The mechanical vibration can be of a magnitude that may result in the measurement of the rotating vector based on gravity being not useful without narrow band filtering at the instantaneous rotation rate of rotating drill string 20 or downhole tool 30. As the instantaneous rotation rate of rotating drill string 20 or downhole tool 30 may change frequently, the instantaneous rotation rate may be difficult to determine, making such narrow band filtering similarly difficult.

In certain embodiments, such as that depicted in FIG. 1 and described herein below, second sensor 33b may be a multi-axis magnetometer and may be located on rotating drill string 20 or downhole tool 30. In certain embodiments, second sensor 33b is located on the same rotating element as first sensor 33a, i.e., a multi-axis magnetometer and a multi-axis accelerometer are both located on drilling string 20 or both located on downhole tool 30. In certain embodiments, second sensor 33b may include a single magnetometer with one or more sensitive axes or two, two or more magnetometers each with a single sensitive axis, or a combination thereof. The axes of the multi-axis magnetometer of second sensor 33b may be nominally orthogonal to each other. When second sensor 33b measures two axes that are non-parallel to the rotation axis of rotating drill string 20 or the rotation axis of downhole tool 30, the multi-axis magnetometer of second sensor 33b may generate a rotating magnetic vector that is coherent but may be of different phase than the gravity vector.

Figure 2:
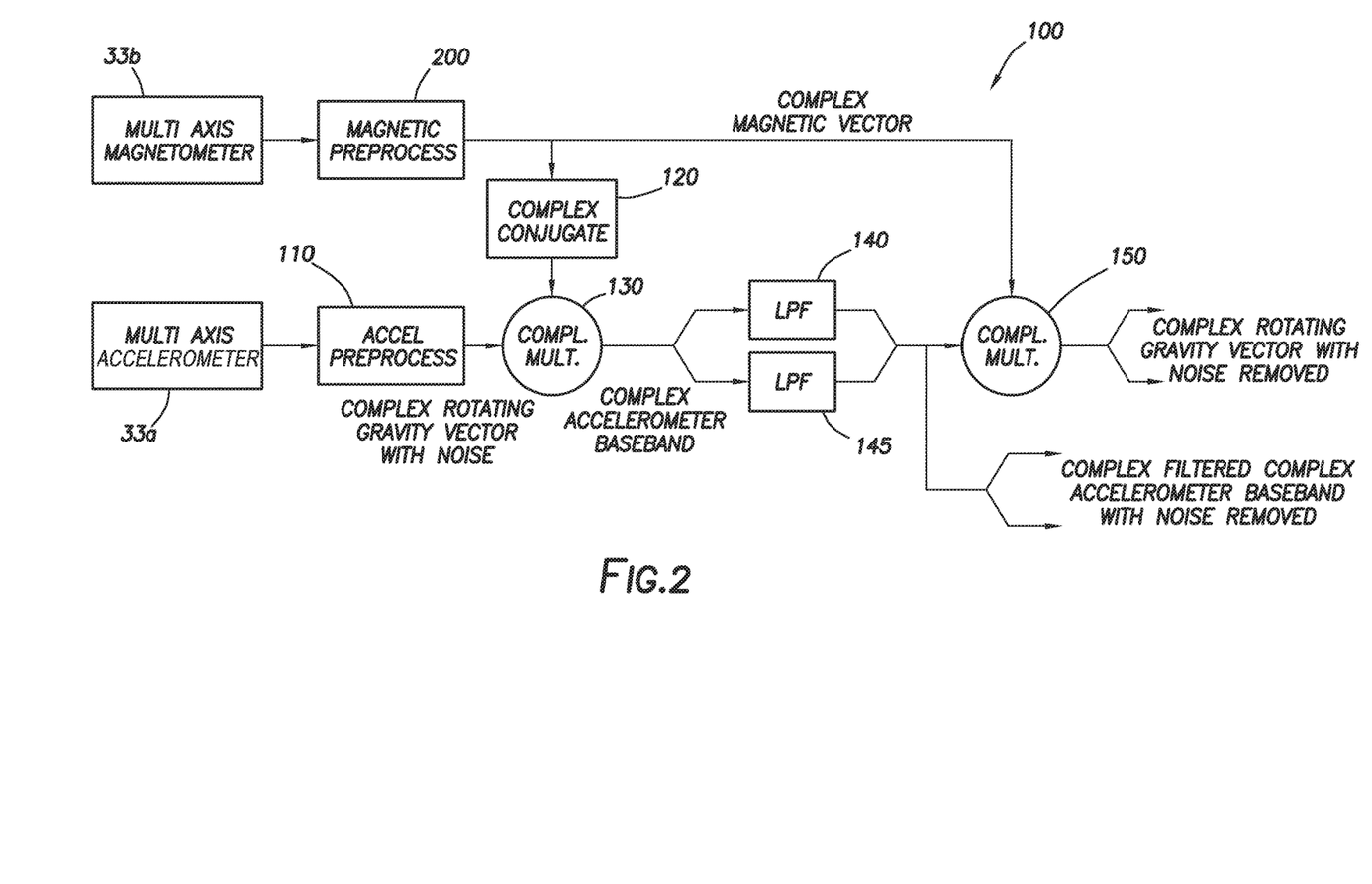
FIG. 2 is a flow chart depicting a noise removal process consistent with embodiments of the present disclosure including coherent filtering.

FIG. 2 depicts noise removal process 100. As one of skill in the art with the benefit of this disclosure will appreciate, noise removal process 100 may not remove all noise due to mechanical vibration or other source that contributes to the signal other than the item of interest, but may, in some embodiments, remove sufficient noise as to determine the lateral gravity vector and/or magnitude of a component of rotating drill string 20 or downhole tool 30 within a predefined variance.

In some embodiments, pre-processing may be performed on the first set of measurements, the reference signal or signals; the second set of measurements; or both. In some embodiments, pre-processing may remove or reduce at least a part of the noise or attenuate frequency ranges that do not contain information about the desired phase references or items of interest. In some embodiments, at least a portion of bias, scale factor, misalignment, and cross axis errors of a measurement of a rotating sensor 32 may be removed, reduced, or otherwise compensated for. In other embodiments, as a general case, the output of a rotating sensor 32 may be represented as:

$$x\text{Measured} = B\text{cross} * x\text{Scale} * \cos(q) + x\text{Bias}$$

$$y\text{Measured} = B\text{cross} * y\text{Scale} * (\cos(\text{misalignmentFactor}) * \sin(-\varphi) + \sin(\text{misalignmentFactor}) * \cos(\varphi)) + y\text{Bias}$$

where Bcross is a cross-axis projection of a vector field and $\varphi$ is the angle between sensor 32 and the reference field.

Figure 3:
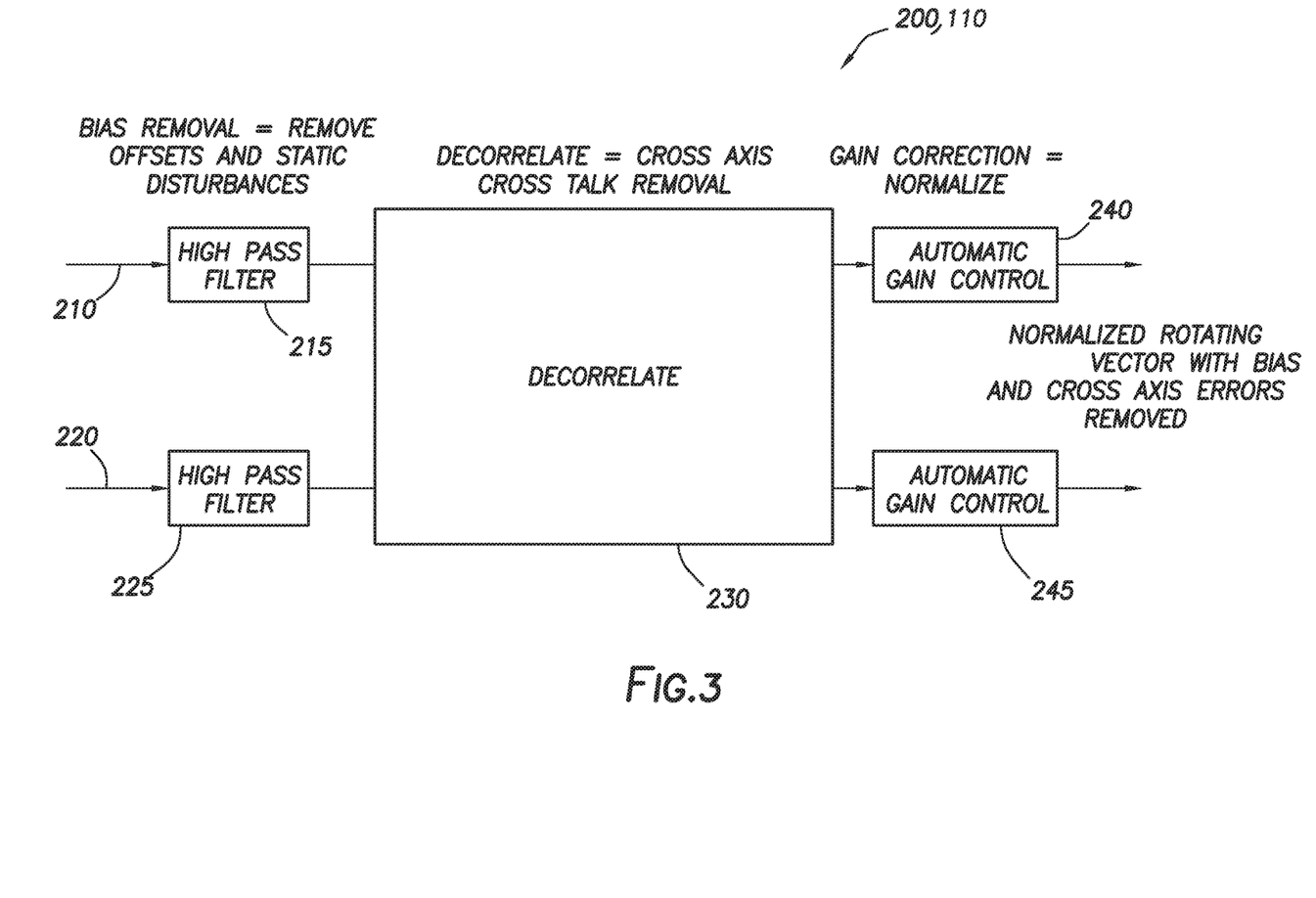
FIG. 3 is a flow chart depicting a pre-processing step consistent with at least one embodiment of the present disclosure.

For example and without limitation, as depicted in FIGS. 2 and 3, the rotating magnetic vector measured by second sensor 33b may be removed in magnetic pre-processing step 200 to generate complex rotating magnetic vector. For example, magnetometer output signals representative of the rotating magnetic vector may be represented as:

$$x\text{Measured} = B\text{cross} * x\text{Scale} * \cos(\text{MTF}) + x\text{Bias}$$

$$y\text{Measured} = B\text{cross} * y\text{Scale} * (\cos(\text{misalignmentFactor}) * \sin(-\text{MTF}) + \sin(\text{misalignmentFactor}) * \cos(\text{MTF})) + y\text{Bias}$$

wherein "MTF" represents the magnetic toolface.

Magnetic pre-processing step 200 may identify estimates for xScale, xBias, yScale, yBias, and misalignmentFactor. Identification of these allows for extracting cos(MTF) and sin(-MTF) from the measured magnetometer output signals, as shown below:

$$\cos(\text{MTF}) = (x\text{Measured} - x\text{Bias})/x\text{Scale}$$

$$\sin(\text{MTF}) = (y\text{Measured} - y\text{Bias} - \text{misalignmentFactor} * (x\text{Measured} - x\text{Bias}))/y\text{Scale}$$

In certain embodiments, MTF may represent magnetic tool face of downhole tool 30.

An exemplary embodiment of magnetic pre-processing step 200 is shown in FIG. 3. In FIG. 3, second sensor 33b outputs 210 and 220 are each processed through high pass filters 215 and 225, respectively. High pass filters 215 and 225 may remove at least a portion of bias error, which may include offsets and static disturbances. After processing through high pass filters 215 and 225, outputs 210 and 220 may be decorrelated in decorrelation step 230. As one of ordinary skill in the art with the benefit of this disclosure will appreciate, in certain embodiments, outputs 210 and 220 may be only partially decorrelated. Following decorrelation step 230, outputs 210, 220 are gain corrected to normalize outputs 210, 220 in automatic gain control steps 240, 245. The resultant outputs 210, 220 are a normalized rotating magnetic vector with at least a portion of bias and cross axis errors removed.

Figure 4A:
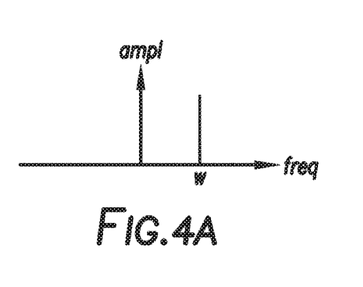
FIG. 4A is a frequency domain graph of a complex rotating vector.

The normalized rotating magnetic vector formed during magnetic preprocessing step 200 may be represented as a complex rotating vector. FIG. 4A is a frequency domain graph of the complex rotating magnetic vector having amplitude (ampl) and tool rotating rate (w).

Figure 4B:
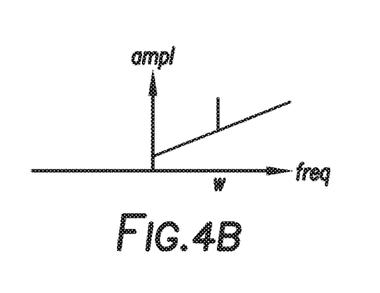
FIG. 4B is a frequency domain graph of a complex rotating vector that contains an item of interest in addition to noise.

As further shown in FIG. 2, the output of first sensor 33*a* may be pre-processed in acceleration preprocessing step 110. In some embodiments, acceleration preprocessing step 110 may operate as depicted in FIG. 3 and discussed above with respect to magnetic preprocessing step 200. In certain embodiment, in acceleration preprocessing step 110, signals from first sensor 33*a* may be corrected, as least in part, for scale factor, bias, and misalignment parameters, where the parameters are identified in-situ, or calibrated offline. In certain embodiments, at least a portion of centripetal and tangential acceleration components may be removed in acceleration preprocessing step 110. The normalized rotating gravity vector formed during acceleration preprocessing step 110 may be represented as a complex rotating vector. The frequency domain representation of the combination of the complex rotating gravity vector and acceleration noise, such as noise from mechanical vibration due to rotation, is shown in FIG. 4B. The acceleration noise is represented by the ramp in FIG. 4B, where the magnitude of the noise increases with increasing frequency. The magnitude and frequency of the complex rotating gravity vector is represented by the peak in FIG. 4B.

Figure 4C:
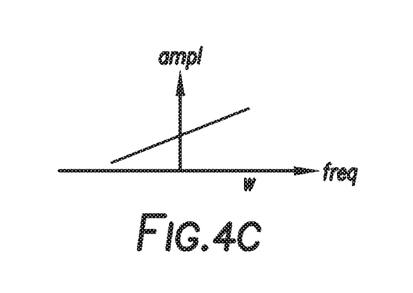
FIG. 4C is a graph of the frequency domain of a complex baseband signal, which is the result of down-converting the signal of FIG. 4B.

In complex conjugate step 120, the complex rotating magnetic vector is converted to its complex conjugate, thus changing the sign of the imaginary component of the complex rotating magnetic vector. The complex conjugate of a rotating vector is equivalent to reversing the direction of rotation of the same rotating vector. In complex multiplication step 130, the magnetic complex conjugate may be multiplied by the complex rotating gravity vector with noise to form a complex accelerometer baseband signal as shown in FIG. 4C. In certain embodiments, processing in complex multiplication step 130 may be performed using polar or rectangular coordinate systems and/or be done in either the time domain or frequency domain. In complex multiplication step 130, complex multiplication results in the addition of the angles of each of the complex numbers. Taking the conjugate of a complex number, which inverts the angle, and then multiplying it by another number, results in the angle difference of the two complex angles. The magnitude of the complex product is the multiplication of the magnitudes of each of the complex numbers. The preprocessing of second sensor 33*b* results in the magnitude of the complex rotating magnetic vector being nominally 1. The product of the complex rotating magnetic vector and the complex rotating accelerometer vector have a magnitude equal to the magnitude of the complex rotating accelerometer vector, but with the difference in angle between the magnetic toolface and gravity toolface.

As shown in FIG. 4C, the complex accelerometer baseband signal includes a DC, or near DC, component representing the angular offset between the gravity vector and magnetic vector and a magnitude equal to the gravity component. The AC component may represent the vibration components of the signal from first sensor 33*a*.

Figure 4D:
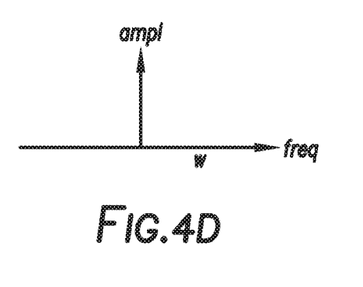
FIG. 4D is a frequency domain graph of a filtered complex baseband signal, which is the result of filtering the signal in FIG. 4C.

In some embodiments, the component representing the angular offset between the gravity vector and magnetic vector, i.e. vibration components and other noise sources that are not synchronous with signal of interest, may be at least partially removed from the complex accelerometer baseband by statistical filtering, averaging, or by using a low pass filter. For example, where a low pass filter is used as shown in FIG. 2 as LPF 140, 145, a filtered complex accelerometer baseband, as shown in FIG. 4D, may be formed. When LPF 140, 145 are low pass filters, LPF 140 may filter the imaginary component and LPF 145 the real component of the complex accelerometer baseband. In certain embodiments, where LPF 140, 145 are low pass filters, the low pass filters should be of sufficient bandwidth to track changes in relationship between magnetic and gravity components, which are typically less than 1 Hz in bandwidth. Sufficient bandwidth may be determined by setting the corner frequency (which in certain embodiments may be defined as the frequency at which attenuation is equal to a defined threshold, with a threshold of for example and without limitation −3 dB) of the low pass filters to be greater than or equal to the bandwidth of the signal of interest. For example, a 1 Hz low pass filter would be sufficient bandwidth. In certain embodiment, a 0.1 Hz range for the low pass filter corner may be used. In certain embodiments, the bandwidth of the low pass filters may be set based on a number of parameters. For instance, the bandwidth may be narrowed to minimize noise, but broadened such that the low pass filters may track the changes in relationship between the magnetic and gravity vectors. In certain embodiments, the outputs of the low pass filters may be stored for use as an initial condition when restarted.

Figure 4E:
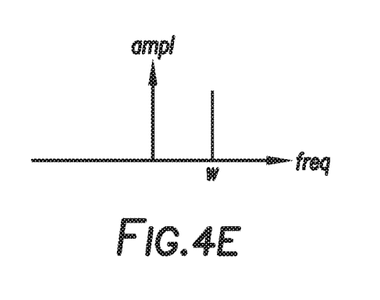
FIG. 4E is a frequency domain graph of a complex rotating vector with noise removed, which is the result of up-converting the signal of FIG. 4D.

As further shown in FIG. 2, the filtered complex accelerometer baseband signal may be complex multiplied by the complex rotating magnetic vector in second complex multiplication step 150 to form a complex rotating gravity vector with noise removed as shown in FIG. 4E. The magnitude of this complex rotating gravity vector may be equal to the magnitude of the cross-axis projection of Earth's gravitational vector.

The rotating gravity vector with vibrational noise removed may be used, for example and without limitation, for gravity tool face generation for geological imaging (including, but not limited to azimuthal gamma ray, azimuthal spectral gamma ray, azimuthal resistivity, azimuthal density, and acoustic imaging), inclination measurements (including, but not limited to continuous inclination measurements), gravity tool face generation for rotary steerable tools, gravity tool face for navigation, tracking a lateral relationship between magnetic and gravity vectors while drilling for applications such as magnetic ranging, proximity detection, continuous azimuth, and collision prevention.

The steps described above with respect to FIGS. 2 and 3 may be performed as a continuous or sampled system in hardware, firmware, or software located in a downhole tool, including, but not limited to downhole tool 30, or at the surface. In certain embodiments, these steps may be performed by program instructions located on non-transitory computer-readable media.

Figure 5:
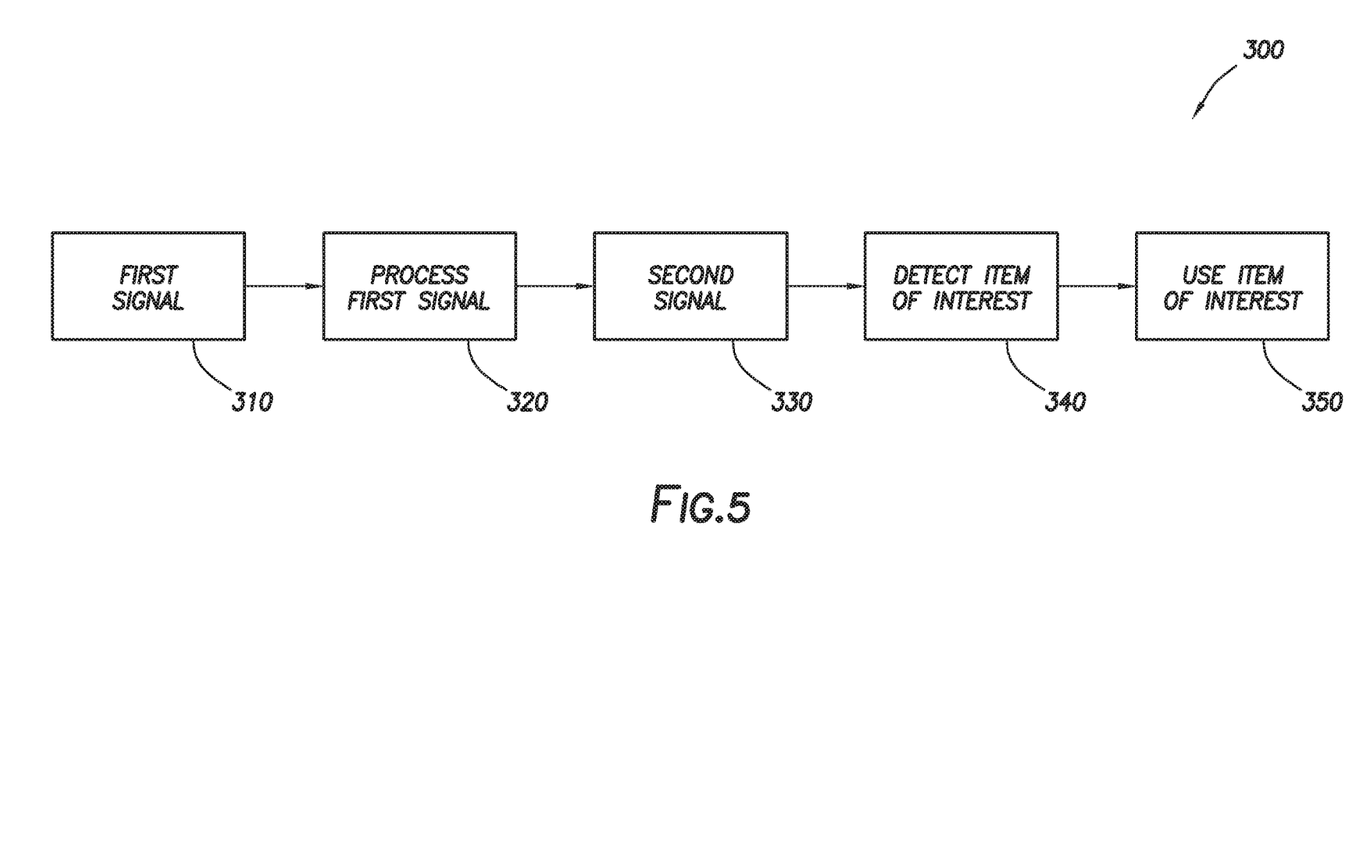
FIG. 5 is a flow chart depicting a signal process consistent with at least one embodiment of the present disclosure.

Certain embodiments of the present disclosure are depicted in FIG. 5. FIG. 5 depicts coherent detection process 300. Coherent detection process 300 includes obtain first set of signal measurements step 310. In some embodiments the first set of signal measurements may be the reference signal as discussed above. In obtain first set of signal measurements step 310, a first set of signals is taken from sensor 32. Examples of sensor 32 include magnetic sensors, gyroscopes, resolvers, encoders, or any other sensor that measures a value representative of a position and/or velocity. Measurements from sensor 32 may include relative, absolute, linear, or angular. In process first signal 320, the first set of signals are processed into a phase reference.

With further direction to FIG. 5, a second set of signals is obtained in obtain second set of signal measurements step 330. The second set of signals may vary as a function of the phase reference. Examples of signals may be from accelerometers, gyroscopes, magnetometers, resistivity sensors, gamma sensors, distance sensors such as caliper or acoustic sensors, density sensors, RPM or jerk sensors, weight on bit sensors, or torque sensors. Using the phase reference and the second signal, an item of interest may be detected or isolated in detect item of interest 340. The item of interest may be detected or isolated by coherent filtering (as discussed above with regard to FIG. 2), binning of the second signal based on the phase reference, use of an LMS adaptive filter, least squares techniques, or a Kalman filter. Binning is the process of averaging values of one signal that are collected at the same time in which another signal is collected within some defined range of values. Each range of values corresponds to one of the bins. Least mean squares (LMS) algorithms are a class of adaptive filter used to mimic a desired filter by finding the filter coefficients that relate to producing the least mean squares of the error signal (difference between the desired and the actual signal). Kalman filtering, also known as linear quadratic estimation (LQE), is an algorithm that uses a series of measurements observed over time, containing statistical noise and other inaccuracies, and produces estimates of unknown variables that tend to be more precise than those based on a single measurement alone, by using Bayesian inference and estimating a joint probability distribution over the variables for each timeframe. Items of interest may include, but are not limited to a cross-axis component of gravity, a cross-axis component of the Earth's rotation rate, a cross-axis component of the magnetic field, cross-axis resistivity, cross axis density, sensor parameters such as scale factor, bias, misalignment, or downhole dynamics such as weight on bit, torque on bit, bending moment, or RPM oscillation. In addition to the above, additional items of interest may include combinations and/or relationships between other items of interest, such as the relative phase relationship of the cross-axis component of gravity and the cross-axis component of the Earth's magnetic field.

After detection of item of interest 340, the item of interest may be used in use item of interest 350. Examples of use of the item of interest may include, but are not limited to, gamma binning (gravity toolface), inclination, and azimuth (difference of magnetic and high side toolface is a function of bdip, inclination, and azimuth). Bdip is the angle of the earth's magnetic field vector with respect to horizontal.

In some embodiments, use item of interest 350 may encompass calculating an estimate of azimuth from items of interest that may include the cross axis magnitude of the earth's magnetic field vector and/or the difference between the high side toolface (phase of the cross-axis component of gravity) and magnetic toolface (phase of the cross-axis component of Earth's magnetic field vector). The magnitude of Earth's magnetic field and the angle between earth's gravity vector and Earth's magnetic vector at the location of the tool, inclination of the down-hole tool, along with the items of interest, can be used per the following to solve for estimate(s) of a down-hole tool's magnetic azimuth.

$$\sin(Azim) = \cos(Inc)\tan(MTF-HTF)\cos(Azim) - \tan(DIP)\sin(Inc)\tan(MTF-HTF)$$

Making the following substitutions:

$$a = \cos(Inc)\tan(MTF-HTF)$$

$$b = \tan(DIP)\sin(Inc)\tan(MTF-HTF)$$

$$x = Azim$$

results in the following:

$$\sin(x) = a*\cos(x) - b$$

Solving the above results in 2 solutions:

$$x = 2\left(\tan^{-1}\left(\frac{\sqrt{a^2 - b^2 + 1} - 1}{a+b}\right) + \pi n\right), n \in Z$$

$$x = 2\pi n - 2\tan^{-1}\left(\frac{\sqrt{a^2 - b^2 + 1} + 1}{a+b}\right), n \in Z$$

When the inclination is <(90-DIP), the correct solution may be determined by calculating the theoretical value for MTF-HTF for each potential azimuth, and choosing the azimuth that results in the MTF-HTF closest to the measured MTF-HTF. The theoretical value for MTF-HTF may be calculated per the following equation.

$$MTF - HTF = \tan^{-1}\left(\frac{-\sin(Azim)}{\cos(Inc)\cos(Azim) - \tan(DIP)\sin(Inc)}\right)$$

At all inclinations, measurements of the cross-axis projection of Earth's magnetic field (Bcross) may be used along with the measured along-axis projection of Earth's magnetic field (Bz) to assist in selecting which of the azimuths is correct. One non-limiting example of selection criteria is to determine the difference between the measured and theoretical values of MTF-HTF, Bcross, and Bz, for the candidate azimuths, and weighting the differences at least in part by the relative sensitivity of the azimuth to variations in the respective values, and estimates of the uncertainty in each of the measured values. The theoretical value of Bcross may be calculated as per the following equation.

$$Bcross = \sqrt{(-\sin(Azim)B_{total}\cos(DIP))^2 + (-\cos(Inc)\cos(Azim)B_{total}\cos(DIP) + \sin(inc)B_{total}\sin(DIP))^2}$$

The theoretical value for Bz may be calculated per the following equation.

$$Bz = B_{total}\cos(DIP)\sin(Inc)\cos(Azim) + B_{total}\sin(DIP)\cos(Inc)$$

Past azimuth estimates and past measurements of values used in estimating azimuth may also be used in determining the current azimuth that meets one or more selection criteria.

Calculating a continuous azimuth and inclination as disclosed may provide advantages to drilling a wellbore. For example, for low inclination operations, the methods disclosed may provide an increase in accuracy that can be used to drill a wellbore with increased precision as compared to the typical method of only calculating surveys when stationary. Where stationary surveys are used, the residual bias in cross-axis measurements typically requires roll shots to be taken to be accounted for, which typically takes additional costly rig time, whereas the low inclination measurements from the methods disclosed reduce or eliminate the errors associated with residual cross axis bias in the sensors while drilling. Additionally, the methods described for estimating inclination and azimuth may allow for a near bit tool to provide a continuous inclination and azimuth estimate that can be used to generate a more accurate model of the wellbore, which may be used to reduce the deviation of a wellbore from the well plan when compared to what is traditionally done with a survey tool being positioned at a significant distance behind the bit. The method described can also be performed without the use of high accuracy sensors, and thus at a much lower cost, then can normally be done with traditional survey tools. The lower cost enables the usage of multiple measurements for inclination and azimuth with multiple tools placed along the BHA.

In one embodiment, coherent detection process 300 may be used to measure inclination from a single rotating accelerometer. The single axis accelerometer may be oriented such that the single axis accelerometer is neither parallel to nor orthogonal to the rotation axis of the downhole tool. The output of an accelerometer oriented such that it is canted at an angle $\theta_Z$ away from the rotational axis of a tool may be calculated as:

Accelerometer output=gravity*ScaleFactor*(cos(Inc)*cos($\theta_Z$)+sin(Inc)*sin($\theta_Z$)*cos(TF))+bias ScaleFactor is the scaling of acceleration by the accelerometer; Inc is the inclination of the rotational axis. TF is the angular position of the tool, about the rotational axis, with respect to gravity. When the downhole tool is rotating at rotation rate $\omega_Z$, the output becomes:

Accelerometer output(t)=gravity*ScaleFactor*(cos(Inc)*cos($\theta_Z$)+sin(Inc)*sin($\theta_Z$)*cos(TF(t)))+bias TF(t)=TF(0)+$\omega_Z$t Coherent detection process 300 applied to the rotating sensor provides an estimation of the components of the accelerometer that vary as a function of TF. The output is:

CoherentFiltering(Accelerometer output(t)=gravity*ScaleFactor*sin(Inc)*sin($\theta_Z$)

The stationary components of the accelerometer output may also be estimated via low pass filtering. Utilizing the filtering step shown as LPF 140, or equivalently LPF 145, as is used for the rotating sensor, may minimize phase errors between the estimations of the stationary (low frequency components) and coherent components for the cases where the inclination and/or rotation rate varies. The estimation of the stationary component is:

LowPassFiltering(Accelerometer output(t)=gravity*ScaleFactor*(cos(Inc)*cos($\theta_Z$))+bias The coherent and stationary components may be combined into an estimation of inclination:

$$\hat{Inc} = \tan^{-1}\left(\frac{Coherent}{Stationary} * K\right) =$$

$$\tan^{-1}\left(\frac{gravity*ScaleFactor*\sin(Inc)*\sin(\theta_z)}{gravity*ScaleFactor*\cos(Inc)*\cos(\theta_z) + bias} * K\right)$$

Simplifying yields:

$$\hat{Inc} = \tan^{-1}\left(\frac{\sin(Inc)\sin(\theta_z)}{\cos(Inc)\cos(\theta_z) + \frac{bias}{gravity*ScaleFactor}} * K\right)$$

Setting K to the following, where $\delta\theta_Z$ is the error in the cant angle with respect to the z axis:

$$K = \frac{\cos(\theta_z)}{\sin(\theta_z)}, \hat{K} = \frac{\cos(\theta_z + \delta\theta_z)}{\sin(\theta_z + \delta\theta_z)}$$

The estimation of inclination may be expressed as:

$$\hat{Inc} = $$

$$\tan^{-1}\left(\frac{\sin(Inc)\sin(\theta_z)\cos(\theta_z + \delta\theta_z)}{\cos(Inc)\cos(\theta_z)\sin(\theta_z + \delta\theta_z) + \frac{bias}{gravity*ScaleFactor} * \sin(\theta_z + \delta\theta_z)}\right)$$

In certain embodiments, use of coherent detection process 300 may provide independent estimations of inclination for each sensor, an estimation in which scale factor errors only couple in to inclination errors through residual bias errors. Such a measurement would still be adversely affected by residual bias and misalignment errors, but not be significantly affected by residual scale factor errors. Such a continuous inclination measurement with a single canted accelerometer may result in improvements at lower inclinations as compared to a single accelerometer without a cant. Additionally, in some embodiments, an estimate of the gravity field can be made by a single canted accelerometer in addition to an inclination estimate. Comparing the estimated gravity field with the known local gravity field may, for example and without limitation, enable in-situ identification of residual misalignment and/or bias errors. One having ordinary skill in the art with the benefit of this disclosure will understand that the above formulae are intended as merely exemplary, and additional noise or error sources, including, for example and without limitation, residual bias or misalignments, may be addressed without deviating from the scope of this disclosure.

In some embodiments of the present disclosure, the coherent filtering of a sensor may be formulated as a harmonic oscillator estimation solution. An estimate of the rotation rate may be used. The estimate of the rotation rate may be derived from, for example and without limitation, magnetometers, gyros, a tachometer, a resolver, or an encoder.

The toolface estimate provided by magnetometers may be differentiated in order to provide an estimation of rotation rate co. Alternatively, any other reference for rotation rate can be used (gyro, resolver, tachometer, etc.). This rotation rate may be used to estimate the in-phase and quadrature components of the signal of interest:

$$\begin{bmatrix} I_x \\ Q_x \\ B_x \end{bmatrix}_k = \begin{bmatrix} \cos(\omega t) & -\sin(\omega t) & 0 \\ \sin(\omega t) & \cos(\omega t) & 0 \\ 0 & 0 & 1 \end{bmatrix} \begin{bmatrix} I_x \\ Q_x \\ B_x \end{bmatrix}_{k-1}$$

Where t signifies the timestep between updates.

Using the above state transition matrix within a Linear Kalman Filter allows for estimation of the in-phase and quadrature components of gravity, while estimating the sensor bias. The measurement matrix may be, for a single axis accelerometer:

$$H = [1\ 0\ 1]$$

where the single axis accelerometer is measuring the addition of the in-phase component and the sensor bias.

There are a number of optional formulations where there are 2 accelerometers (X and Y). If the two accelerometers are orthogonal, the following formulation may be used:

$$\begin{bmatrix} I_{xy} \\ Q_{xy} \\ B_x \\ B_y \end{bmatrix}_k = \begin{bmatrix} \cos(\omega t) & -\sin(\omega t) & 0 & 0 \\ \sin(\omega t) & \cos(\omega t) & 0 & 0 \\ 0 & 0 & 1 & 0 \\ 0 & 0 & 0 & 1 \end{bmatrix} \begin{bmatrix} I_{xy} \\ Q_{xy} \\ B_x \\ B_y \end{bmatrix}_{k-1} \quad H = \begin{bmatrix} 1 & 0 & 1 & 0 \\ 0 & 1 & 0 & 1 \end{bmatrix}$$

In another embodiment, two separate estimators for each accelerometer may be used.

A difference between the harmonic oscillator formulation and coherent detection process 300 is that coherent detection process 300 may use higher order filters to reject near-band noise sources. Both the harmonic oscillator formulation and coherent detection process 300 solve for the in-phase and quadrature components of a signal of interest, given a separate phase reference.

In certain embodiments of the present disclosure, coherent detection process 300 may be used to determine an estimate of cross-axis field magnitude. For a tool rotating at $\omega$ radians per second which includes one or more vector sensors that respond to a vector field, each sensor generates a signal that is a function of the difference between its input axis direction and the cross-axis component of a vector field. One example may be given by:

$$Sens_1(t) = (Field_{Cross} \cos(\omega t + \phi_1) + \eta_1(t)) Scale_1 + Bias_1$$

$$Sens_2(t) = (Field_{Cross} \cos(\omega t + \phi_2) + \eta_2(t)) Scale_2 + Bias_2$$

When the scale factor, bias and phase offset terms are known for the vector sensors, corrected orthogonal vector sensors may be determined by:

$$Sig_1(t) = Field_{Cross} \cos(\omega t + \phi_{Field}) + \eta_1(t)$$

$$Sig_2(t) = Field_{Cross} \sin(\omega t + \phi_{Field}) + \eta_2(t)$$

where $\eta$ represents noise on the sensor signal.

In some embodiments, the reference signal may also vary as a function of the rotation rate $\omega$, given by:

$$Ref(t) = f(\omega t, \dots)$$

where "..." signifies that other elements in addition to the rotation rate that affect the reference signal.

With knowledge of $f(\omega t, \dots)$, a set of orthogonal reference signals may be computed that have the following relationship with $\omega$:

$$R_X(t) = \cos(\omega t + \phi_{REF}(t))$$

$$R_Y(t) = \sin(\omega t + \phi_{REF}(t))$$

Utilizing these reference signals and the at least one corrected vector sensors, an estimate of the magnitude of the cross axis field sensed by the at least one vector sensor may be calculated. Additionally, the difference between $\phi_{Ref}$ and $\phi_{Field}$ may also be calculated.

In a first non-limiting example, measurements are taken with cross-axis magnetometers and cross-axis accelerometers: $M_X$, $M_Y$, $A_X$, $A_Y$.

Measurements from the cross-axis magnetometers may respond to the magnetic vector field as follows:

$$M_X(t) = \cos(\theta_{MTF}(t))$$

$$M_Y(t) = \sin(-\theta_{MTF}(t))$$

where the relationship between magnetic toolface ($\theta_{MTF}$) and high side toolface or gravity toolface ($\theta_{HTF}$) is given by:

$$\theta_{MTF} = \theta_{HTF} + \varphi$$

The output of a pair of orthogonal accelerometers on that same tool that measures the cross axis component of gravity, along with noise $\eta$, may be given by:

$$A_X(t) = A_{Cross} \cos(\theta_{HTF}(t)) + \eta_X(t)$$

$$A_Y(t) = A_{Cross} \sin(-\theta_{HTF}(t)) + \eta_Y(t)$$

where $A_{Cross}$ is a function of inclination:

$$A_{Cross} = (gravity) \sin(Inclination)$$

The accelerometer and magnetometer signals may be represented as complex signals:

$$Acc = A_X(t) + jA_Y(t)$$

$$Mag = M_X(t) + jM_Y(t)$$

The complex accelerometer signal (Acc) and complex conjugate of the magnetometer signal (Mag) may be complex multiplied, referred to as complex down-conversion. The complex down-conversion may yield the following:

$$z(t) = (A_X(t) + jA_Y(t))(M_X(t) - jM_Y(t))$$

Estimations of the mean values for both the real and imaginary components z(t) may be performed. In some embodiments, each component may be individually low pass filtered, but other methods may be used. Filtering, in some embodiments, with respect to the real component, may result in $$Re(z(t)) = A_X(t)M_X(t) + A_Y(t)M_Y(t)$$

$$Re(z(t)) = (A_{Cross} \cos(\theta_{HTF}(t)) + \eta_X(t))\cos(\theta_{HTF}(t) + \phi) + (A_{Cross} \sin(-\theta_{HTF}(t)) + \eta_Y(t))\sin(-\theta_{HTF}(t) - \phi)$$

The expected value of the real component may be given by:

$$E[Re(z(t))] = A_{Cross} E[\cos(\theta_{HTF}(t))\cos(\theta_{HTF}(t) + \phi) + \sin(-\theta_{HTF}(t))\sin(-\theta_{HTF}(t) - \phi)]$$

This equation may be simplified, for example and without limitation, using trigonometric identities to:

$$E[Re(z(t))] = A_{Cross} E\left[\frac{1}{2}\cos(-\phi) + \right.$$

-continued
$$\frac{1}{2}\cos(2\theta_{HTF}(t)+\phi) + \frac{1}{2}\cos(\phi) - \frac{1}{2}\cos(-2\theta_{HTF}(t)-\phi)\Big]$$

Further simplification may yield:

$$E[Re(z(t))] = A_{Cross}E[\cos(\phi)]$$

$$E[Re(z(t))] = A_{Cross}\cos(\phi)$$

Similarly, for the imaginary component:

$$E[Im(z(t))] = A_{Cross}E[-A_x(t)M_y(t) + A_y(t)M_y(t)]$$

$$E[Im(z(t))] =$$
$$A_{Cross}E[-\cos(\theta_{HTF}(t))\sin(-\theta_{HTF}(t)-\phi) + \sin(-\theta_{HTF}(t))\cos(\theta_{HTF}(t)+\phi)]$$

$$E[Im(z(t))] = A_{Cross}E\Big[-\frac{1}{2}\sin(-2\theta_{HTf}(t)-\phi) - \frac{1}{2}\sin(-\phi) +$$
$$\frac{1}{2}\sin(-2\theta_{HTf}(t)-\phi) + \frac{1}{2}\sin(-\phi)\Big]$$

$$E[Im(z(t))] = A_{Cross}\sin(\phi)$$

The complex baseband signal may therefore be represented as:

$$z(t) = A_{Cross}(\cos(\phi) + j\sin(\phi))$$

Solving for phase and magnitude yields a measure of the cross axis component of the gravity field as well as the angle difference between magnetic and gravity toolface:

$$\tan^{-1}\Big(\frac{Im(z(t))}{Re(z(t))}\Big) = \tan^{-1}\Big(\frac{A_{Cross}\sin(\phi)}{A_{Cross}\cos(\phi)}\Big) = \phi$$

$$\sqrt{Re(z(t))^2 + Im(z(t))^2} = \sqrt{A_{Cross}^2(\cos^2(\phi)+\sin^2(\phi))} = A_{Cross}.$$

In a second, non-limiting example, measurements are taken with cross-axis magnetometers and a single accelerometer: $M_X$, $M_Y$, $A_X$.

In such an embodiment, the complex accelerometer signal will either have its real or imaginary component equal to 0. For example, where the imaginary component is 0:

$$Acc = A_X(t)$$

$$Mag = M_X(t) + jM_Y(t)$$

Complex down-conversion yields:

$$z(t) = A_X(t)M_{X(t)} - jA_X(t)M_Y(t)$$

$$z(t) = (A_{Cross}\cos(\theta_{HTF}(t))+\eta_X(t))\cos(\theta_{HTF}(t)+\phi) - j$$
$$(A_{Cross}\cos(\theta_{HTF}(t))+\eta_X(t))\sin(-\theta_{HTF}(t)-\phi)$$

The expected value of the real component may be:

$$E[Re(z(t))] = A_{Cross}E[\cos(\theta_{HTF}(t))\cos(\theta_{HTF}(t)+\phi)]$$

$$E[Re(z(t))] = A_{Cross}E\Big[\frac{1}{2}\cos(-\phi) + \cos(2\theta_{HTF}(t)+\phi)\Big]$$

$$E[Re(z(t))] = \frac{A_{Cross}}{2}\cos(\phi)$$

The expected value of the imaginary component may be:

$$E[Im(z(t))] = A_{Cross}E[\cos(\theta_{HTF}(t))\sin(-\theta_{HTF}(t)-\phi)]$$

$$E[Im(z(t))] = A_{Cross}E\Big[\frac{1}{2}\sin(-2\theta_{HTF}(t)-\phi) + \frac{1}{2}\sin(-\phi)\Big]$$

$$E[Im(z(t))] = \frac{A_{Cross}}{2}\sin(-\phi)$$

In such an embodiment, the sinusoidal components that vary with $2\theta_{HTF}(t)$ may not cancel out as in the cross-axis accelerometers example. In such an embodiment, the sinusoidal components may be filtered out via the method chosen for estimating the mean value. In an example in which the estimation of the mean is from time $t_1$ to $t_2$:

$$E[Im(z(t))]_{t=t_1 \to t_2} = \frac{A_{Cross}}{2}\sin(-\phi) + E\Big[\frac{A_{Cross}}{2}\sin(-2\theta_{HTF}(t)-\phi)\Big]_{t=t_1 \to t_2}$$

Assuming perfect estimation, the complex baseband signal may be represented as:

$$z(t) = \frac{A_{Cross}}{2}(\cos(\phi) + j\sin(-\phi))$$

Solving for phase and magnitude yields a measure of the cross axis component of the gravity field as well as the angle difference between magnetic and gravity toolface:

$$\tan^{-1}\Big(\frac{Im(z(t))}{Re(z(t))}\Big) = \tan^{-1}\Bigg(\frac{\frac{A_{Cross}}{2}\sin(\phi)}{\frac{A_{Cross}}{2}\cos(\phi)}\Bigg) = -\phi$$

$$\sqrt{Re(z(t))^2 + Im(z(t))^2} = \sqrt{\frac{A_{Cross}^2}{4}(\cos^2(\phi)+\sin^2(\phi))} = \frac{A_{Cross}}{2}$$

In some embodiments, a least squares approach may be used to correct for residual errors in scale factor, bias, and misalignment. In some embodiments, a least squares approach may be used to solve for the magnitude of the cross axis component of the field. In an embodiment where a least squares approach is used to correct for residual errors in scale factor, bias, and misalignment, where $m_x$ and $m_y$ are a pair of cross axis sensors, Sx and Sy are their respective scale factors, bx and by represent the bias terms, and $\phi$ is the misalignment factor of the 2 sensors:

$$\phi = \sin(\text{misalignment})$$

$$m_x = \cos(\theta)S_X + b_X$$

$$m_y = \sin(-\theta)S_Y + b_Y + \phi\cos(\theta)S_X$$

The sum of squares of the 2 sensors may be given by:

$$(m_x^2 + m_y^2) = (\cos(\theta)S_X+b_X)^2 + (\sin(-\theta)S_Y+b_Y+\phi\cos(\theta)S_X)^2$$

Rearranging Yields:

$$(m_x^2+m_y^2) = \cos^2(\theta)S_X^2(1+\phi^2) + \sin^2(-\theta)S_Y^2 + \cos(\theta)\sin(-\theta)2S_XS_Y\phi + \cos(\theta)(2b_X+2b_Y\phi) + \sin(-\theta)S_Y2b_y + b_X^2+b_Y^2$$

These equations may be simplified, using, for example and without limitation, trig identities. The least squares problem may be given by:

$$Ax=b$$

Where the estimates for each phase angle are:

$$\theta_i = \tan^{-1}\left(\frac{-m_{Y_i}}{m_{X_i}}\right)$$

the least squares components may be given by:

$$A = \begin{bmatrix} \cos(\theta_1) & \sin(-\theta_1) & \cos(2\theta_1) & \sin(-2\theta_1) & 1 \\ \cos(\theta_2) & \sin(-\theta_2) & \cos(2\theta_2) & \sin(-2\theta_2) & 1 \\ \vdots & \vdots & \vdots & \vdots & \vdots \\ \cos(\theta_N) & \sin(-\theta_N) & \cos(2\theta_N) & \sin(-2\theta_N) & 1 \end{bmatrix}$$

$$x = \begin{bmatrix} 2S_X(b_X + b_Y\phi) \\ S_Y 2 b_y \\ \frac{1}{2}S_X^2(1+\phi^2) - \frac{1}{2}S_Y^2 \\ S_X S_Y \phi \\ \frac{1}{2}S_X^2(1+\phi^2) + \frac{1}{2}S_Y^2 + b_X^2 + b_Y^2 \end{bmatrix}$$

$$b = \begin{bmatrix} m_{X_1}^2 + m_{Y_1}^2 \\ m_{X_2}^2 + m_{Y_2}^2 \\ \vdots \\ m_{X_N}^2 + m_{Y_N}^2 \end{bmatrix}$$

Where N is the number of observations, N being greater than or equal to 5, $$\begin{bmatrix} \cos(\theta_1) & \sin(-\theta_1) & \cos(2\theta_1) & \sin(-2\theta_1) & 1 \\ \cos(\theta_2) & \sin(-\theta_2) & \cos(2\theta_2) & \sin(-2\theta_2) & 1 \\ \vdots & \vdots & \vdots & \vdots & \vdots \\ \cos(\theta_N) & \sin(-\theta_N) & \cos(2\theta_N) & \sin(-2\theta_N) & 1 \end{bmatrix}$$

$$\begin{bmatrix} 2S_X(b_X + b_Y\phi) \\ S_Y 2 b_y \\ \frac{1}{2}S_X^2(1+\phi^2) - \frac{1}{2}S_Y^2 \\ S_X S_Y \phi \\ \frac{1}{2}S_X^2(1+\phi^2) + \frac{1}{2}S_Y^2 + b_X^2 + b_Y^2 \end{bmatrix} = A \begin{bmatrix} x_0 \\ x_1 \\ x_2 \\ x_3 \\ x_4 \end{bmatrix} = \begin{bmatrix} m_{X_1}^2 + m_{Y_1}^2 \\ m_{X_2}^2 + m_{Y_2}^2 \\ \vdots \\ m_{X_N}^2 + m_{Y_N}^2 \end{bmatrix}$$

Solving for each term, where $\hat{S}_X$ and $\hat{S}_Y$ are prior estimates, or may be solved iteratively for each update:

$$\nabla b_Y = \frac{x_1}{2\hat{S}_Y}, \nabla \phi = \frac{x_4}{\hat{S}_X \hat{S}_Y}, \nabla b_X = \frac{x_0}{2\hat{S}_X} - \nabla b_Y \nabla \phi,$$

$$\nabla S_Y^2 = x_4 - x_2 - \nabla b_X^2 - \nabla b_Y^2, \nabla S_X^2 = \frac{2x_2 + \nabla S_Y^2}{1 + \nabla \phi^2}$$

$$\nabla S_Y = \sqrt{\nabla S_Y^2}, \nabla S_X = \sqrt{\nabla S_X^2}$$

Sensor parameters may be adjusted by the product of above errors and desired adaptation rates for each sensor parameter. In some embodiments, iterations would be performed of generating estimated phase angles by utilizing the current estimates of scale factor, bias, and misalignment, and then using those estimates to solve for any residual errors in scale factor bias and misalignment.

Although described herein in terms of rectangular coordinate systems, one having ordinary skill in the art with the benefit of this disclosure will understand that other coordinate systems, including, for example and without limitation, polar coordinate systems may be utilized without deviating from the scope of this disclosure. Likewise, although described in terms of the time domain, one having ordinary skill in the art with the benefit of this disclosure will understand that embodiments described herein may be used in the frequency domain without deviating from the scope of this disclosure.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure.

The invention claimed is:

1. A method comprising:
   obtaining a first set of signal measurements with a first sensor, the first set of signal measurements varying as a function of a phase reference;
   obtaining a second set of signal measurements with a second sensor, the second set of signal measurements including an item of interest, the second set of signal measurements varying as a function of the phase reference;
   calculating an estimate of the phase reference from the first set of signal measurements;
   detecting the item of interest using the second set of signal measurements and the estimate of the phase reference; and
   using the item of interest.

2. The method of claim 1, wherein the item of interest is a cross axis projection of a gravitational field within a formation or an estimate of a gravity toolface, and wherein using the item of interest comprises generating a model of a formation surrounding a wellbore within which the first and second sensor are positioned or generating a model of the wellbore.

3. The method of claim 2, wherein the second sensor is an accelerometer, gyroscope, magnetometer, resistivity sensor, gamma sensor, distance sensor such as a caliper or acoustic sensor, density sensor, RPM or jerk sensor, weight on bit sensor, or torque sensor.

4. The method of claim 2, wherein the second sensor is a gamma sensor, resistivity sensor, distance sensor, or density sensor; the second set of signal measurements includes an item of interest comprising radiation measurements, resistivity measurements, distance measurements, or density measurements; and using the item of interest comprises generating a model of the surrounding formation.

5. The method of claim 4, wherein the first sensor is an accelerometer, gyroscope, magnetometer, resistivity sensor, gamma sensor, distance sensor such as a caliper or acoustic sensor, density sensor, or RPM or jerk sensor, the first sensor and second sensor positioned in a single downhole tool, and wherein the variation in the first set of signal measurements and second set of signal measurements is caused by rotation of the downhole tool.

6. The method of claim 2, wherein the second sensor is an accelerometer, gyroscope, or magnetometer; the second set of signal measurements includes an item of interest comprising gravity toolface cross-axis component of gravity, a cross-axis component of the Earth's rotation rate, or a cross-axis component of the magnetic field; and using the item of interest comprises generating a model of the wellbore.

7. The method of claim 6, wherein the first sensor is an accelerometer, gyroscope, magnetometer, resistivity sensor, gamma sensor, distance sensor such as a caliper or acoustic sensor, density sensor, or RPM or jerk sensor, the first sensor and second sensor positioned in a single downhole tool, and wherein the variation in the first set of signal measurements and second set of signal measurements is caused by rotation of the downhole tool.

8. The method of claim 1, wherein the item of interest is a scale factor of the first or second sensor, bias of the first or second sensor, or misalignment between the first and second sensors, and wherein using the item of interest comprises recalibrating the first or second sensor.

9. The method of claim 1, wherein the first and second sensors are each one of an accelerometer, gyroscope, magnetometer, resistivity sensor, gamma sensor, distance sensor such as a caliper or acoustic sensor, density sensor, RPM or jerk sensor, weight on bit sensor, or torque sensor.

10. The method of claim 1, wherein the first and second sensors are coupled to a single downhole tool.

11. The method of claim 1, wherein the first and second sensors are the same type of sensor.

12. The method of claim 1, wherein the first and second sensors are different types of sensor.

13. The method of claim 1, wherein the item of interest may be detected by coherent filtering, binning of the second signal based on the phase reference, use of an LMS adaptive filter, use of a least squares technique, or use of a Kalman filter.

14. The method of claim 1, wherein the item of interest is a gravity toolface cross-axis component of gravity; a cross-axis component of the Earth's rotation rate; a cross-axis component of the magnetic field; angular velocity; angular acceleration; angular jerk; cross-axis resistivity; cross axis density; a sensor parameter such as scale factor, bias, misalignment; a downhole dynamics parameter such as weight on bit, torque on bit, bending moment, or RPM oscillation; or a combination or relationship between other items of interest, such as a relative phase relationship of a cross-axis component of gravity and a cross-axis component of the Earth's magnetic field.

15. The method of claim 14, wherein using the item of interest comprises: drilling dynamics applications including estimating bending force vs toolface, vibration vs toolface, torque vs toolface, RPM vs toolface, RPM variation vs toolface, axial acceleration vs toolface, or bit bounce as a function of toolface; formation evaluation or geological imaging applications including binning formation evaluation sensors vs toolface or coherently filtering formation evaluation sensors using a toolface reference; estimating and/or recalibrating for residual sensor errors; directional drilling applications including steering either a bent sub motor or rotary steerable; survey applications including estimating inclination and/or azimuth of the wellbore; magnetic ranging, proximity detection, or collision prevention applications including tracking a lateral relationship between magnetic and gravity vectors.

16. The method of claim 14, wherein using the item of interest comprises estimating bending force vs toolface; estimating vibration vs toolface; estimating torque vs toolface; estimating RPM vs toolface; estimating RPM variation vs toolface; estimating axial acceleration vs toolface; estimating bit bounce as a function of toolface; correcting for residual sensor errors; identifying sensor parameters, estimating wellbore inclination and/or azimuth; steering either a bent sub motor or a rotary steerable tool; binning formation evaluation sensors vs toolface; coherently filtering formation evaluation sensors; geological imaging; tracking a lateral relationship between magnetic and gravity vectors.

17. The method of claim 1, wherein the item of interest is a scale factor of the first or second sensor, bias of the first or second sensor, misalignment between the first and second sensors, or combination thereof and wherein using the item of interest comprises recalibrating the first or second sensor, or estimating these parameters for the first or second sensor.

18. The method of claim 1, wherein the first sensor contains information about the rotational state of a downhole tool relative to at least one reference frame.

19. The method of claim 1, wherein the first sensor is a magnetic sensor, angular rate sensor, angular position sensor, accelerometer, tachometer, distance sensor, resolver, encoder, or any combination thereof.

20. The method of claim 1, wherein:
the first set of signal measurements are obtained from a magnetic sensor set containing at least 1 axis;
the second set of signal measurements are obtained from an accelerometer sensor set containing at least 1 sensor axis;
the phase reference estimate is a complex rotating magnetic vector calculated from a magnetic pre-processing step; and
the item of interest is a gravity toolface.

21. The method of claim 20, wherein the step of detecting the item of interest comprises:
generating a complex rotating gravity vector with noise from the second set of signal measurements from an accelerometer pre-processing step;
complex multiplying the magnetic complex conjugate with the complex rotating gravity vector with noise to form a complex accelerometer baseband signal;
removing vibration components of the complex accelerometer baseband signal to form a filtered complex accelerometer baseband signal; and
complex multiplying the filtered complex accelerometer baseband signal with the complex rotating magnetic vector to form a complex rotating gravity vector with noise removed.

22. The method of claim 21, wherein the accelerometer pre-processing step further comprises removing at least a portion of bias, scale factor, misalignment, cross-axis errors or a combination thereof of the complex rotating gravity vector.

23. The method of claim 20, wherein the magnetic pre-processing step further comprises removing at least a portion of bias, scale factor, misalignment, cross-axis errors or a combination thereof of the complex rotating magnetic vector.

* * * * *